Dec. 30, 1958 R. W. DONNELLY 2,866,834
METHOD AND APPARATUS FOR SEPARATING WATER AND FLUID HYDROCARBONS
Filed May 17, 1956
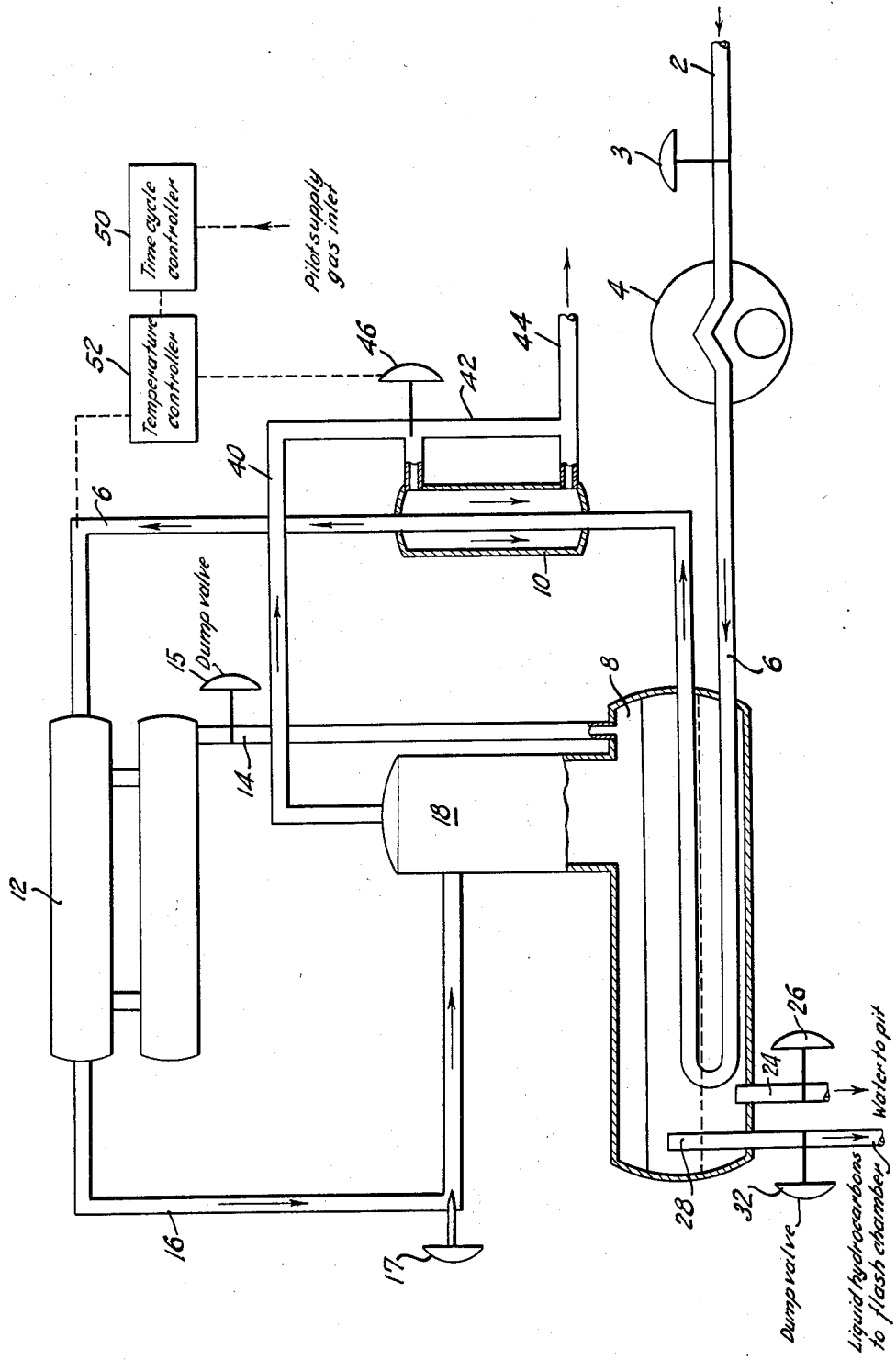

United States Patent Office 2,866,834
Patented Dec. 30, 1958

2,866,834

METHOD AND APPARATUS FOR SEPARATING WATER AND FLUID HYDROCARBONS

Richard W. Donnelly, Bellaire, Tex., assignor to The Texas Company, New York, N. Y., a corporation of Delaware Application May 17, 1956, Serial No. 585,475

6 Claims. (Cl. 260—676)

This invention relates to a method and apparatus for separating water and readily liquefiable hydrocarbons, such as propane and butane, from well gases and other fluid hydrocarbon streams.

Prior to the present invention in the conventional method for separating water and liquefiable hydrocarbons from a gaseous stream in a high pressure, low temperature system wherein the stream is expanded to cause a decrease in temperature thereby condensing readily liquefiable hydrocarbons, it was necessary to employ temperatures above that at which hydrocarbon hydrates would form in the high pressure section of the system in order to prevent stoppage from hydrate clogging. In this conventional method the maximum low temperature obtainable at a specified pressure with continuous operation is limited by the relatively high temperature requirement in the high pressure section. The temperature limitations of this method result in the formation of a wet tail gas and consequently loss of liquefiable hydrocarbons in the gaseous stream, particularly in areas where mixed fluid streams come from wells at pressures so low that the cooling effect, due to the expansion of the gas, is not enough to reach the equilibrium temperature necessary for the production of a drier gas demanded by some consumers.

The present invention concerns a continuous method for separating water and readily liquefiable hydrocarbons from gaseous streams under pressure in a gas separating system which comprises first cooling said stream by heat exchange means to a temperature at which hydrocarbon hydrates form, thereafter separating liquids from the gaseous stream, further cooling the gaseous stream by expansion, separating additionally formed liquids, and recurrently interrupting the first cooling step to cause the system to be flushed of hydrate formation by the incoming gaseous stream. The cooling by heat exchange means preferably includes the utilization of the cold outgoing product gas from the gas separating system which is passed in heat exchange relationship with the incoming fluid stream. The interrupting of said cooling by heat exchange is carried out by temperature independent means which preferably cause the outgoing product gas to by-pass the heat exchange means thereby allowing said incoming gaseous stream to proceed through the system at a temperature which is above that at which the hydrocarbon hydrates are formed, consequently flushing it of any formed hydrates.

The invention also includes an improvement in a high pressure, low temperature gas separator having means to cool an incoming fluid stream by heat exchange, means to separate or collect the liquid portion of said cooled fluid stream, means to expand said fluid stream and means to collect liquid formed after expansion of the fluid stream, which comprises automatic, temperature independent means to recurrently interrupt said heat exchange cooling means. The automatic means preferably comprises a time cycle controller adapted to periodically interrupt the flow of the cooling medium to the heat exchange means. However, other temperature independent means for interrupting said cooling means are useful, such as a pressure sensitive element situated in the high pressure section of the gas separator to signal a pressure variation therein caused by hydrate formation. The signal will then activate a device to cause the cooling medium to by-pass the heat exchanger. The cooling medium preferably employed is the cold outgoing tail gas which is directed to the heat exchanger prior to leaving the system.

A schematic diagram of a low temperature gas separation gas unit in accordance with the present invention, is illustrated in the accompanying drawing.

By the time the fluid stream coming from a well reaches the well head, some of the hydrocarbon gas has condensed to a liquid and a substantial portion of the water present in the gas has also condensed to the liquid phase. This mixture of liquids and gases, hereafter referred to as the fluid stream, enters the system at 2 under pressure from the well. The gas flow is regulated by inlet choke or valve 3 and thereafter passes through heater 4. The extent of heat at 4 is determined by the temperature of the gases coming from the well. The warm stream then proceeds through conduit 6 to the bottom of the liquid collection zone 8 where it imparts heat to that zone for melting any formed hydrates which have fallen therein and is itself cooled down. The stream then passes through heat exchanger 10, where it is further cooled, by indirect heat exchange with the outgoing tail gas, and then to the liquid separating zone 12 wherein liquid water, liquid hydrocarbons and hydrates present in the fluid stream separate and are eventually deposited at the bottom of the liquid collection zone 8 by way of conduit 14 through dump valve 15, which opens after sufficient liquid is collected in the bottom portion of separator 12.

After leaving the water separation zone 12, the gas stream is conducted to the expansion zone 18 by a conduit 16. A flow rate choke 17 regulates the gas entering the expansion zone 18 under a specified pressure thereby allowing for the maintenance of optimum conditions at which the higher boiling hydrocarbons are condensed and fall out of the gas stream. The cold dry tail gas then proceeds through conduit 40 to either heat exchanger 10 or conduit 42 and out of the system at 44 to storage or consumer.

Liquefied hydrocarbons in the liquid collection zone 8 float on top of the water which has flowed into the zone 8 from the separator 12. A water outlet 24, which has a dump valve 26 therein, is situated at the bottom of high pressure separator. There is also a liquid hydrocarbon outlet 28 standing relatively higher in collection zone 8 than outlet 24 and leading to a low pressure flash chamber (not shown) outlet 28 also has a dump valve 32 therein.

A three-way valve 46 controls the flow of cold tail gas or outgoing product gas to the heat exchanger 10. In the present and preferred embodiment, valve 46 is pneumatically operated by a low pressure air supply controlled by a time cycle element 50. A temperature controller 52 is set so that the system can operate at temperatures at which hydrocarbon hydrates will form and the time cycle element overrides this temperature controller so that the cycles of operation will be maintained at all times. The time cycle element 50 maintains valve 46 in position to allow the cold outgoing product gas to enter the heat exchanger 10 for a definite period of time to cool the incoming fluid stream. Periodically the time cycle element will cause valve 46 to be positioned so that the cold outgoing gas will by-pass heat exchanger 10 thereby allowing the warm incoming gas to flush the system of formed hydrates. It can be seen that the average temperature in the high pressure zone of the system will be much lower than in the conventional method and therefore will provide increased recovery and a drier tail gas.

The time cycle element or clock controller 50 is initially regulated to obtain the best performance for any period of time and ambient temperature. This is ascertained by experimentation. The length of time of the cycle of operation will depend in each case on well temperature, heater temperature, ambient temperature, well pressure, etc., and adjustments must be made to compensate therefor.

The following examples are set forth to demonstrate the effectiveness of the method and apparatus in accordance with this invention.

*Example I*

A Camco Type-A Time Clock Controller was installed downstream on the pilot supply gas line to a Foxboro Temperature Controller on a Parkersburg Hyreco Processing Unit. The temperature controller had its temperature sensitive element positioned at the entrance to the water separating zone and was capable of activating the three-way valve which directed the cold tail gas to the heat exchanger or caused the gas to by-pass the heat exchanger.

The time clock controller was set to run at maximum cooling for 53 minutes and at maximum heating for 7 minutes. The cooling by the heat exchanger was limited only by losses to the atmosphere and by the temperature setting on the temperature controller. The heating was limited by inlet temperature which was controlled by inlet flow rate and a temperature controller on the inlet heater. The minimum inlet temperature was controlled by the well head temperature.

The inlet valve or choke downstream from the unit was set from its normal ½ inch to a $27/64$ inch opening. The setting on the temperature controller was reduced from 80° F. to 35° F. The opening on the regulating choke into the expansion zone was changed from $14/64$ inch and 850 p. s. i. to $17/64$ inch and 640 p. s. i.

The results of this run for 24 hours showed an increase in recovery over conventional operation of 6.2 percent and the tail gas produced was significantly drier.

*Example II*

Using the same apparatus as set forth in Example I, a seven day test using both conventional and improved methods was conducted consecutively on the same well. In the seven day test using the conventional method, the time clock controller was disconnected and the temperature controller set at 80° F. The regulating choke was set at $14/64$ inch with 850 p. s. i. The inlet valve was set as ½ inch and the inlet heater was off. The results after seven days of conventional operation were as follows:

Total distillate_____ 291.74 bbls.
Total gas_____ 16,023 MCF.
Recovery_____ 18.21 bbls./MMCF.
Stock tank distillate gravity_____ 59.1 °API at 60° F.

(MCF.=thousand standard cubic feet)
(MMCF.=million standard cubic feet)

In the seven day test using the improved method and apparatus of this invention, the time clock controller was connected and the temperature controller was set at 35° F. The inlet choke or valve opening was initially changed to $32/64$ inch and the regulating choke to the expansion zone was reset to $17/64$ inch and 760 p. s. i. The time clock controller was on a 7 minute hot and 53 minute cold cycle and the inlet line heater was off. After the first hour and a half, the regulating choke was changed to $18/64$ inch and 780 p. s. i. and the inlet choke to $31/64$ inch. After another half hour the regulating choke was adjusted to $18/64$ inch and 770 p. s. i. and inlet choke back to $32/64$ inch.

The results after seven days of improved operation were as follows:

Total distillate_____ 424.27 bbls.
Total gas_____ 17,723 MCF.
Recovery_____ 23.94 bbls./MMCF.
Stock tank distillate gravity_____ 56.5 °API at 60° F.

These results showed a 31.5 percent increase in recovery over the conventional method and, again, a much drier gas was produced.

Obviously, many modifications and variations of the invention, as hereinbefore set forth, may be made without departing from the spirit and scope thereof and, therefore, only such limitations should be imposed as are indicated in the appended claims.

I claim:

1. A continuous method for separating water and readily liquefiable hydrocarbons from gaseous streams under pressure in a gas separating system which comprises first forming hydrocarbon hydrates in said stream by cooling by heat exchange means, thereafter separating liquids from the gaseous stream, further cooling the gaseous stream by expansion, again separating liquids from the gaseous stream, and recurrently interrupting said first cooling to cause the system to be flushed of hydrate formation by the incoming gaseous stream.

2. A continuous method for separating water and readily liquefiable hydrocarbons from gaseous streams under pressure in a gas separating system as described in claim 1 wherein recurrently interrupting said first cooling comprises causing a coolant to by-pass said heat exchange means.

3. A continuous method for separating water and readily liquefiable hydrocarbons from gaseous streams under pressure in a gas separating system which comprises first forming hydrocarbon hydrates in said stream by cooling by heat exchange means, thereafter separating liquids from the gaseous stream, further cooling the gaseous stream by expansion, again separating liquids from the gaseous stream, passing said expanded gaseous stream to said heat exchange means to be used as a coolant, and recurrently interrupting the passage of said expanded gaseous stream to the heat exchange means to cause the system to be flushed of hydrate formation by the incoming gaseous stream.

4. A high pressure, low temperature gas separator which comprises means to cool an incoming fluid stream by heat exchange, means to separate a liquid portion of said cooled stream, means to thereafter expand said fluid stream, and means to separate any liquid formed after the expansion of said stream, and automatic, temperature independent means to recurrently interrupt said heat exchange coling means whereby said incoming fluid stream will recurrently warm up said separator.

5. A high pressure, low temperature gas separator as described in claim 4 wherein said automatic, temperature independent means comprises a time cycle element adapted to periodically interrupt said heat exchange cooling means.

6. A high pressure, low temperature gas separator as described in claim 4 wherein said automatic, temperature independent means comprises a pressure sensitive element situated in the high pressure section of said gas separator and adapted to recurrently interrupt said heat exchange cooling means whenever a pressure variation occurs in said high pressure section.

References Cited in the file of this patent

UNITED STATES PATENTS

| | | |
|---|---|---|
| 2,375,559 | Hutchinson et al. | May 8, 1945 |
| 2,758,665 | Francis | Aug. 14, 1956 |
| 2,769,309 | Irvine | Nov. 6, 1956 |